May 26, 1931.  G. P. PROCTOR  1,807,494
LOCKING THREAD CONNECTION
Filed March 7, 1930
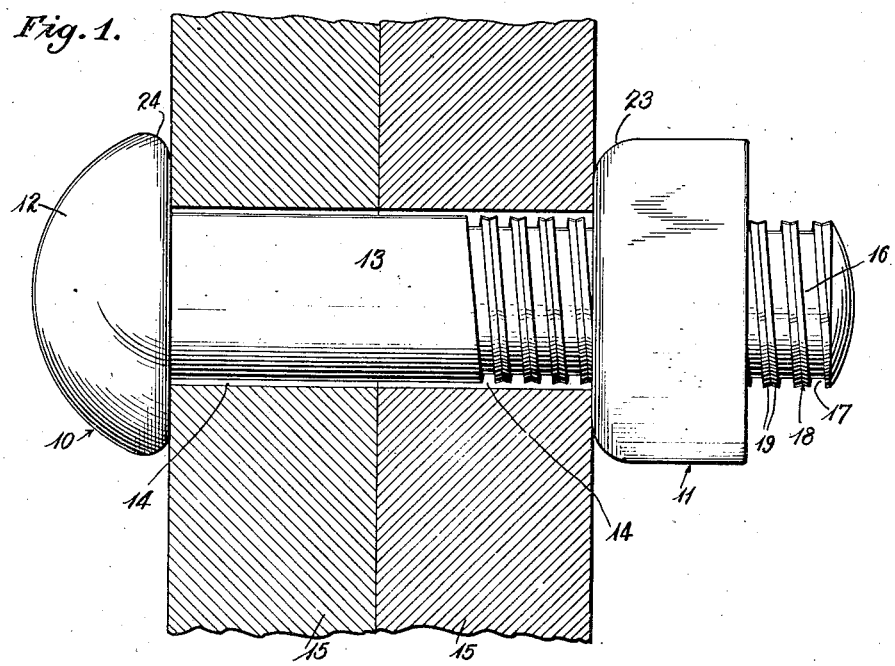
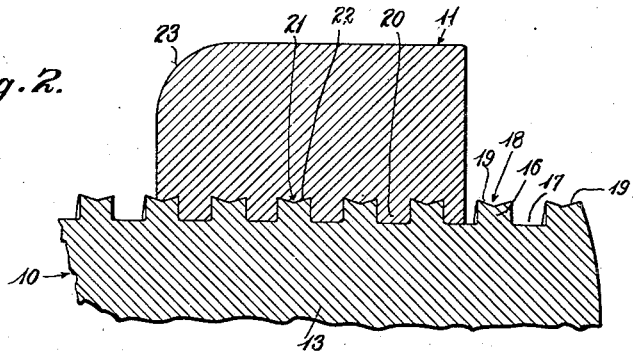
Inventor
George P. Proctor Patented May 26, 1931

1,807,494

UNITED STATES PATENT OFFICE

GEORGE P. PROCTOR, OF WICHITA FALLS, TEXAS

LOCKING THREAD CONNECTION

Application filed March 7, 1930. Serial No. 433,927.

My invention relates to a locking thread connection. It is primarily aimed to provide a novel construction whereby parts having engaged pre-formed screw threads are locked against relative movement and nevertheless may be rapidly moved relatively during fastening and unfastening.

Another object is to produce in such a combination screw threads which are substantially square and at least those of one of the engaged members are peripherally grooved to have diverging walls and the walls of the coacting grooves of the other member being shaped to intimately fit the same.

Still further it is aimed to provide a construction wherein the spaces between the screw threads of both members are substantially filled by the adjacent threads so that the structure will not be weakened and in coaction with the peripheral grooves mentioned, the threads will be practically inoperable of stripping or cross-threading.

Additional objects and advantages will be apparent from the description following taken in connection with the accompanying drawings illustrating an operative embodiment.

In said drawings,

Fig. 1 is a view showing a bolt embodying my improvements, in position securing parts together, the latter being shown in section, and Fig. 2 is an enlarged longitudinal detail sectional view through a portion of the nut and bolt.

Referring specifically to the drawings wherein like reference characters designate like or similar parts in the several views, 10 generally designates a preferably metallic bolt, and all preferably a metallic nut in screw threaded relation thereon. Said bolt 10 has a head 12 and a shank 13 extending therefrom and through openings 14 in a plurality of conventional parts 15, which are adapted to be secured together by the said bolt and nut.

Reverting to the shank 13 it is provided with a relatively strong pre-formed screw thread 16 which is substantially square or rectangular in cross section and of the same width as the groove 17 separating the coils or spirals thereof. Said thread 16 is peripherally grooved, as at 18, and the base walls 19 of the groove are preferably relatively flat and diverging from the center to the side walls of the thread.

The nut 11 at its bore is provided with a pre-formed screw thread 20 square or rectangular in cross section, and the groove between the same is of the same width as the thread 20. In addition, the base wall of the groove between the threads 20 is provided, having diverging walls 22 at the same angle as the walls 19.

As a result, the screw threads and grooves of the nut and of the bolt snugly fit and engage each other, as in Fig. 2, so that the maximum strength is secured.

The nut 11 at its work-engaging face is peripherally rounded off or chamfered, especially at the corners, as at 23, and also at the sides, to enable it to better engage the work and to tilt when necessary to conform to the latter and any stresses imposed thereon by the bolt. For the same reasons the work-engaging face of the head 12 of the bolt is peripherally rounded off or chamfered, as at 24.

In the use of the bolt, it will be realized that if there is any tendency for the bolt to loosen or the nut to have retrograde movement, there will be a slight tilting or canting of either the nut or the bolt whereby the walls 19 and 22 will tend to flatten each other and adjacent parts of the thread and more efficiently bind and accordingly secure or lock the nut and bolt against relative movement. Particularly, attention is directed to the fact that with such a construction, there can hardly be any stripping of the threads of either the nut or the bolt, or any cross-threading thereof such as will interfere with the engagement or disengagement of the nut and bolt.

The illustration of the threads is to be taken as general and not limited to application to a nut and bolt specifically since the principles of the invention may be utilized in other connections, and, for example, may be used in securing together sections of rods, such as sucker rods, as used in connection with wells.

Various changes may be resorted to provided they fall within the spirit and scope of the invention.

I claim as my invention:

1. In combination, a bolt shank provided with a screw thread, a nut, said nut having a screw thread operable on the first mentioned screw thread, one of said screw threads being peripherally grooved, the wall of the other screw thread between spirals thereof substantially conforming in shape to the aforesaid groove and substantially filling the same.

2. In a device of the class described, in combination, a bolt shank provided with a screwthread, the sides thereof substantially perpendicular to the axis of the shank, a nut provided with an internal screwthread complemental to the first named screwthread, one of said screwthreads being peripherally grooved, the bottom of the space between turns of the other screwthread formed with a ridge conforming to the shape of said groove.

GEORGE P. PROCTOR.